(12) United States Patent
Kim et al.

(10) Patent No.: US 11,675,079 B2
(45) Date of Patent: Jun. 13, 2023

(54) IMAGE SENSING DEVICE AND OPERATING METHOD THEREOF

(71) Applicant: SK hynix Inc., Gyeonggi-do (KR)

(72) Inventors: Hak Soon Kim, Gyeonggi-do (KR); Han Sang Kim, Gyeonggi-do (KR); Jeong Eun Song, Gyeonggi-do (KR); Min Seok Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 33 days.

(21) Appl. No.: 17/324,635

(22) Filed: May 19, 2021

(65) Prior Publication Data
US 2022/0179073 A1    Jun. 9, 2022

(30) Foreign Application Priority Data
Dec. 8, 2020 (KR) .................. 10-2020-0170495

(51) Int. Cl.
| | |
|---|---|
| *G01S 17/36* | (2006.01) |
| *G06T 7/521* | (2017.01) |
| *G01S 7/4911* | (2020.01) |
| *G01S 17/894* | (2020.01) |
| *H04N 25/705* | (2023.01) |

(52) U.S. Cl.
CPC ............ *G01S 17/36* (2013.01); *G01S 7/4911* (2013.01); *G01S 17/894* (2020.01); *G06T 7/521* (2017.01); *H04N 25/705* (2023.01)

(58) Field of Classification Search
CPC ...... G01S 17/36; G01S 7/4911; G01S 17/894; G01S 7/4915; G06T 7/521; H04N 5/36965; H04N 5/378

USPC .......................................... 348/135
See application file for complete search history.

(56) References Cited

U.S. PATENT DOCUMENTS

| | | | |
|---|---|---|---|
| 9,109,888 B2 | 8/2015 | Korekado et al. | |
| 10,382,736 B1 * | 8/2019 | Thurner | H04N 13/296 |
| (Continued) | | | |

FOREIGN PATENT DOCUMENTS

KR    10-2017-0088259        8/2017

OTHER PUBLICATIONS

Chen et al., An Up-to-1400nm 500MHz Demodulated Time-of-Flight Image Sensor on a Ge-on-Si Platform, ISSCC 2020, Feb. 2020, p. 98-p. 100, IEEE.

*Primary Examiner* — Marnie A Matt
(74) *Attorney, Agent, or Firm* — IP & T Group LLP

(57) ABSTRACT

An image sensing device includes an optical emitter outputting a modulated signal to a target object; an optical receiver generating, according to a phase control signal, pixel signals corresponding to a reflected signal from the target object; an image processor calculating a depth phase based on the pixel signals and compensating for the depth phase according to a phase offset signal to output a depth information signal; a driving control circuit generating the phase control signal corresponding to a phase of the modulated signal and setting an initial phase difference between the modulated signal and the phase control signal according to the phase offset signal; and an offset calculating circuit setting a plurality of reference phases, selecting a reference phase closest to the depth phase among the set reference phases and generating the phase offset signal representing a phase difference between the selected reference phase and the depth phase.

17 Claims, 12 Drawing Sheets

(56) References Cited

U.S. PATENT DOCUMENTS

| | | | |
|---|---|---|---|
| 2011/0051119 A1* | 3/2011 | Min | G01S 7/491 |
| | | | 356/5.1 |
| 2013/0278917 A1* | 10/2013 | Korekado | G01S 7/484 |
| | | | 356/5.01 |
| 2014/0362364 A1* | 12/2014 | Waligorski | G01S 7/4815 |
| 2017/0234985 A1* | 8/2017 | Kadambi | G01S 17/894 |
| | | | 702/152 |
| 2018/0106891 A1* | 4/2018 | Thurner | G01S 7/497 |
| 2020/0209392 A1* | 7/2020 | Sadhu | G01S 17/89 |
| 2021/0048531 A1* | 2/2021 | Medower | G01S 7/4815 |
| 2021/0088636 A1* | 3/2021 | Xu | G01S 17/894 |
| 2021/0247500 A1* | 8/2021 | Dehlinger | G01S 17/10 |
| 2021/0389465 A1* | 12/2021 | Belokonskiy | G01S 17/894 |
| 2022/0244393 A1* | 8/2022 | Belokonskiy | G01S 7/4915 |
| 2022/0254821 A1* | 8/2022 | Basavalingappa | G01S 17/36 |

* cited by examiner

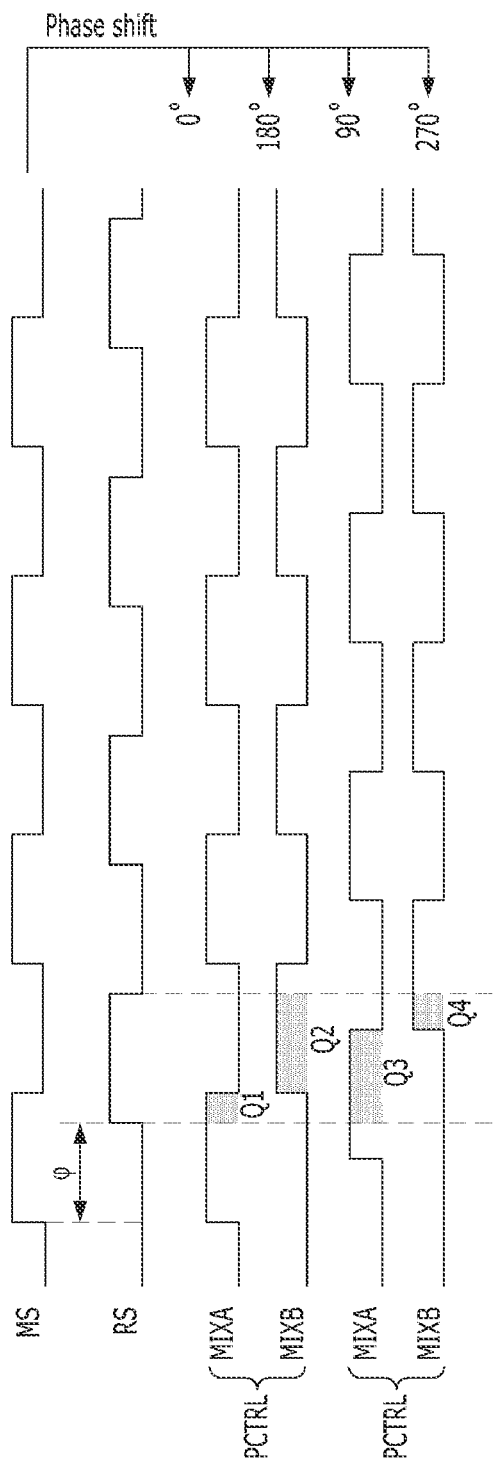

IMAGE SENSING DEVICE AND OPERATING METHOD THEREOF

CROSS-REFERENCE TO RELATED APPLICATION

The present application claims priority of Korean Patent Application No. 10-2020-0170495, filed on Dec. 8, 2020, which is herein incorporated by reference in its entirety.

BACKGROUND

1. Field

The present disclosure relates to semiconductor design technology, and specifically to, an image sensing device for acquiring depth information using a time-of-flight (TOF) scheme.

2. Description of the Related Art

A TOF system calculates a distance from an origin to an object by measuring a flight time of light or a signal. Generally, the flight time is a time that the light or the signal travels from the source to the object and/or the time the light or the signal travels back from the object to the source. The origin may be a source of the light or signal such as a TOF sensor using the TOF system. The TOF sensor outputs an image including depth information of the object based on the distance. A conventional sensor is capable of outputting a two-dimensional (2D) image representing a color and a shape of the object, but the TOF sensor may output a three-dimensional (3D) image representing not only the 2D image of the object but also a depth of the object.

SUMMARY

Various embodiments of the present invention are directed to an image sensing device capable of adjusting an initial phase offset between a modulated signal output from an optical emitter and a phase control signal for controlling an optical receiver based on depth information acquired by a TOF scheme, and an image sensing method thereof.

According to an embodiment of the present invention, an image sensing device an optical emitter suitable for outputting a modulated signal to a target object; an optical receiver suitable for generating, according to a phase control signal, pixel signals corresponding to a reflected signal from the target object; an image processor suitable for calculating a depth phase based on the pixel signals and compensating for the depth phase according to a phase offset signal to output a depth information signal; a driving control circuit suitable for generating the phase control signal corresponding to a phase of the modulated signal and setting an initial phase difference between the modulated signal and the phase control signal according to the phase offset signal; and an offset calculating circuit suitable for setting a plurality of reference phases, selecting a reference phase closest to the depth phase among the set reference phases and generating the phase offset signal representing a phase difference between the selected reference phase and the depth phase.

According to an embodiment of the present invention, an image sensing method includes outputting, at an optical emitter, a modulated signal to a target object; generating, at an optical receiver, pixel signals corresponding to a reflected signal from the target object according to a phase control signal; calculating a depth phase based on the pixel signals; setting a plurality of reference phases, selecting a reference phase closest to the depth phase among the set reference phases and generating a phase offset signal representing a phase difference between the selected reference phase and the depth phase; setting an initial phase difference between the modulated signal and the phase control signal according to the phase offset signal; and compensating for the depth phase according to the phase offset signal to output a depth information signal.

According to an embodiment of the present invention, an operating method of an image sensing device includes generating and outputting a source signal to a target; receiving a reflected signal that is the source signal reflected from the target; generating a control signal having a lagging phase to the source signal by a predetermined amount indicated by an offset signal; generating a pixel signal based on the reflected signal by controlling a unit pixel through the control signal; calculating a depth phase based on the pixel signal; outputting a depth information by compensating for the depth phase according to the offset signal; selecting one among reference phases, the selected reference phase having a least offset from the depth phase; and updating the offset signal to represent the least offset.

According to the embodiments of the present invention, the image sensing device using the TOF scheme for acquiring the depth information may set an initial phase offset between the modulated signal and the phase control signal based on the depth information. Further, the image sensing device may compensate for the acquired depth information using the initial phase offset, thereby minimizing the depth error and obtaining accurate depth information.

BRIEF DESCRIPTION OF THE DRAWINGS

FIG. 4 is a timing diagram for describing an operation of an image sensing device using a TOF scheme.

DETAILED DESCRIPTION

Figure 1:
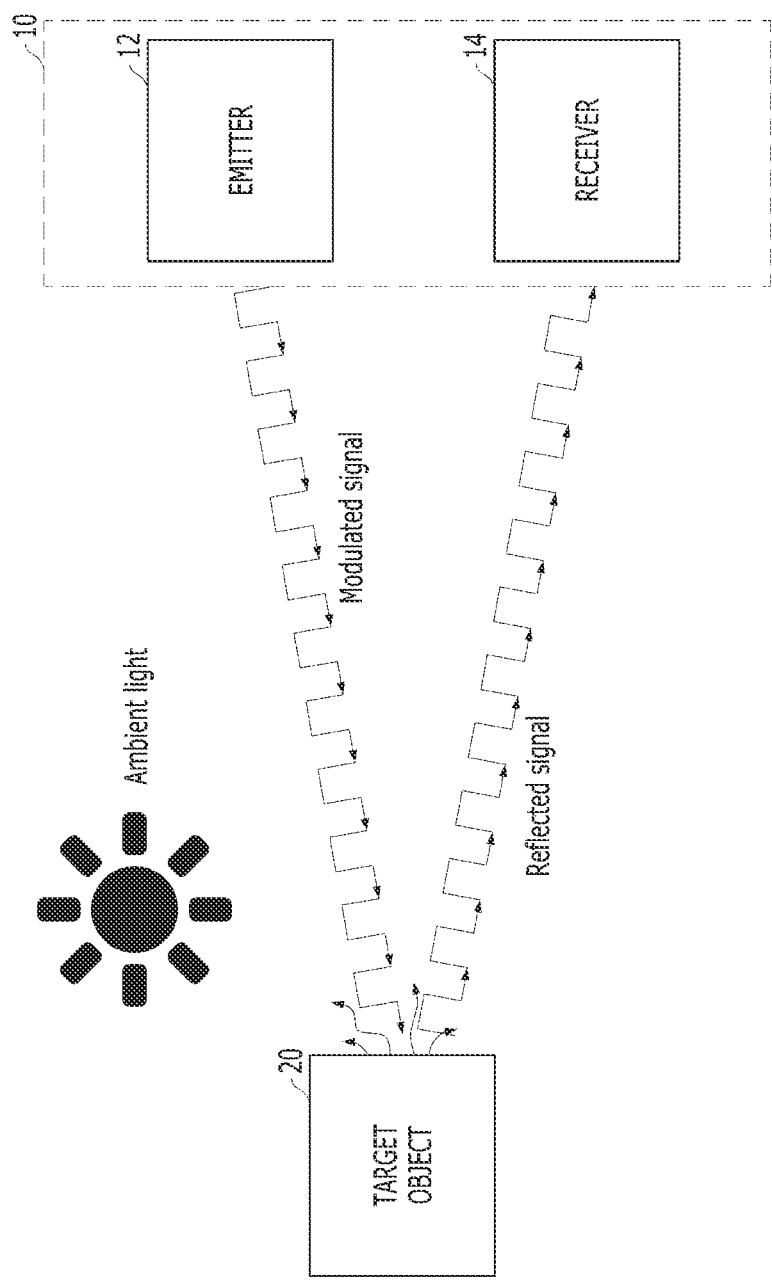
FIG. 1 is a diagram illustrating an operation of an image sensing device using a time-of-flight (TOF) scheme.

Various embodiments of the present invention are described below with reference to the accompanying drawings. The embodiments may, however, be embodied in different forms and thus should not be construed as limited to the embodiments set forth herein. Throughout the disclosure, like reference numerals refer to like parts throughout the various figures and embodiments of the present invention. It is noted that reference to "an embodiment," "another embodiment" or the like does not necessarily mean only one embodiment, and different references to any such phrase are not necessarily to the same embodiment(s). The term "embodiments" when used herein does not necessarily refer to all embodiments.

It will be understood that, although the terms "first", "second", "third", and so on may be used herein to identify various elements, these elements are not limited by these terms. These terms are used to distinguish one element from another dement that otherwise have the same or similar names. Thus, a first element in one instance could &so be termed a second or third dement in another instance without indicating any change in the element itself.

It will be further understood that when an element is referred to as being "connected to", or "coupled to" another element, it may be directly on, connected to, or coupled to the other dement, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless stated or the context indicates otherwise.

As used herein, singular forms may include the plural forms as well and vice versa, unless the context dearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

FIG. 1 is a diagram illustrating an operation of an image sensing device 10 using a time-of-flight (TOF) scheme.

Referring to FIG. 1, the image sensing device 10 using a TOF scheme may measure a distance from a target object 20. The image sensing device 10 is considered one of very important devices for automation development in various industrial fields and consumer markets. A device used by a consumer, such as a mobile phone, a tablet, a vehicle and the like may include the image sensing device 10. The image sensing device 10 may be used to recognize a surrounding environment and/or a position of the device in the surrounding environment. For example, a camera including the image sensing device 10 may determine a color, a shape, and a depth (distance) of the target object 20 included in a three-dimensional (3D) environment (e.g., scene or image frame) to provide a 3D vision technology for the consumer using the device.

The image sensing device 10 may include an emitter 12 configured to output a modulated signal used for measuring a distance from the target object 20, and a receiver 14 configured to receive a reflected signal reflected from the target object 20. The modulated signal outputted from the emitter 12 in the image sensing device 10 may have a preset pattern. The emitter 12 may shoot modulated signals to the surrounding environment. The modulated signals may be reflected from various objects in the surrounding environment. When the reflected signal is received through the receiver 14, the image sensing device 10 may determine a distance based on a correlation relationship (e.g., a phase difference) between the modulated signal, which is outputted from the emitter 12, and the reflected signal which is received by the receiver 14.

In a procedure of recognizing the correlation relationship between the modulated signal and the reflected signal and determining the distance based on the correlation relationship, ambient light may disturb the image sensing device 10. Specifically, in order to obtain a distance (e.g., depth information) in a bright sunlight environment or to require a high resolution of the distance, an additional process may need to be performed to remove disturbance (e.g., noise) caused by the ambient light.

Figure 2:
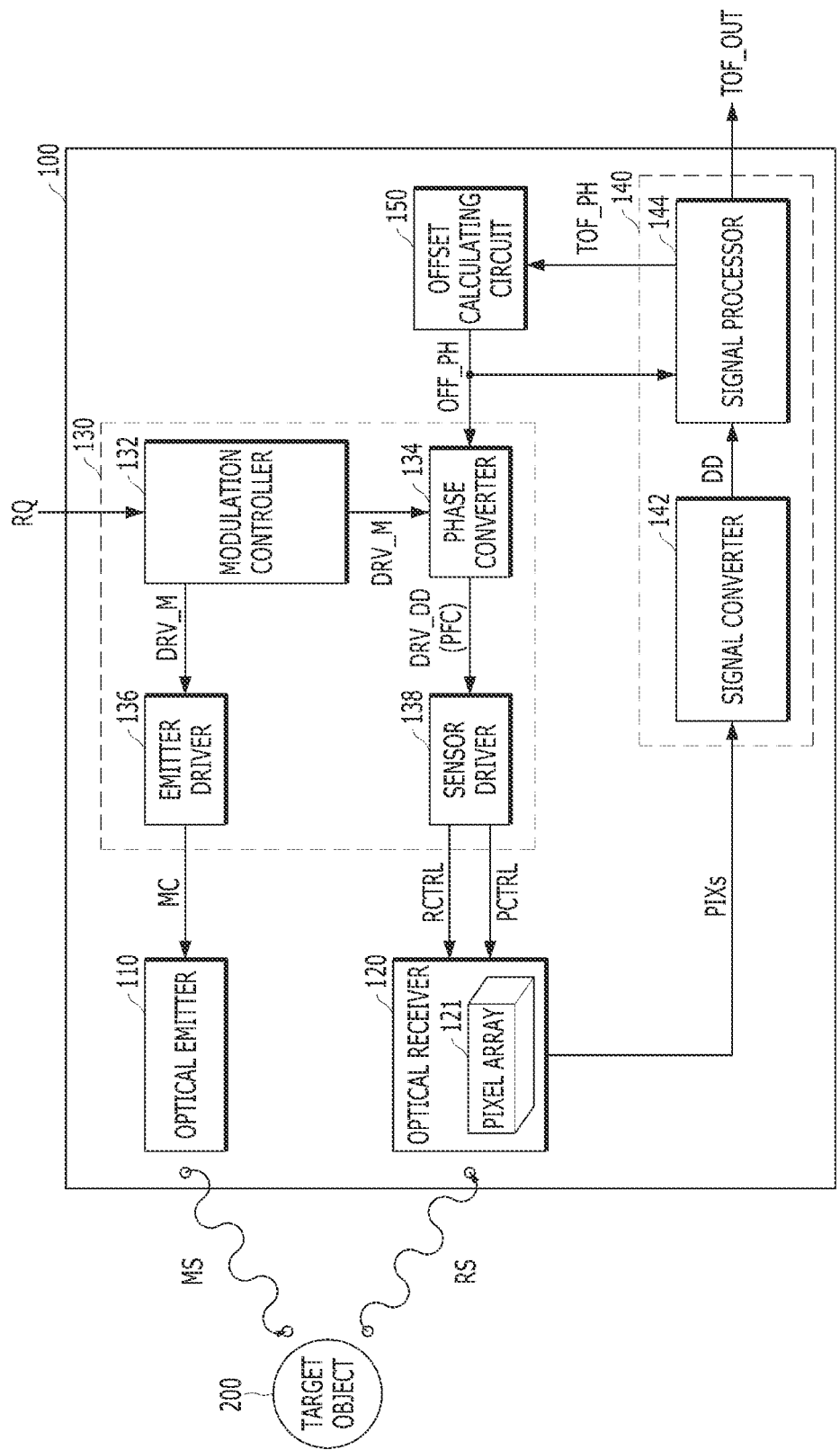
FIG. 2 is a block diagram illustrating an image sensing device using a TOF scheme in accordance with a first embodiment of the present invention.

FIG. 2 is a block diagram illustrating an image sensing device 100 using a TOF scheme in accordance with a first embodiment of the present invention.

Referring to FIG. 2, the image sensing device 100 may generate a depth information signal TOF_OUT indicating a depth from a target object 200, based on a TOF scheme. For example, the image sensing device 100 may detect a phase difference between a modulated signal MS outputted to the target object 200 and a reflected signal RS reflected from the target object 200 to generate the depth information signal TOF_OUT.

The image sensing device 100 may include an optical emitter 110, an optical receiver 120, a driving control circuit 130, an image processor 140, and an offset calculating circuit 150.

The optical emitter 110 may output the modulated signal MS to the target object 200. For example, the modulated signal MS may be a periodic signal (e.g., a clock signal) that toggles periodically. Depending on an embodiment, the optical emitter 110 may sequentially output the modulated signal MS having different phases from each other to the target object 200. For example, the modulated signal MS may have at least two phases selected from 0 degree (i.e., 360 degree), 90 degree, 180 degree, and 270 degree. For reference, 0 degree may be substantially the same as 360 degree. The optical emitter 110 may include a light emitting diode (LED) or a laser diode (LD). The modulated signal MS outputted from the optical emitter 110 may have a frequency that belongs to an infrared or ultraviolet region, not a visible light region used to determine the color or shape of the target object 200 contained in a three-dimensional environment. For example, the optical emitter 110 may output a light at a particular wavelength (e.g., near-infrared rays of 850 nm).

The optical receiver 120 may receive the reflected signal RS reflected from the target object 200. The reflected signal RS may be inputted to the optical receiver 120 after a delay corresponding to a TOF of the signals from when the modulated signal MS is output. The optical receiver 120 may include a pixel array 121 for generating a plurality of pixel signals PIXs corresponding to the reflected signal RS. The optical receiver 120 may remove noise, caused by ambient light, from the reflected signal RS, and provide the reflected signal RS whose noise is removed, to the pixel array 121. In the embodiment, the pixel array 121 may configure a TOF sensor. Although FIG. 2 shows that the optical receiver 120 includes the pixel array 121, the pixel array 121 may be placed in a separate configuration from the optical receiver 120.

The pixel array 121 may generate the pixel signals PIXs by measuring, collecting, or determining the reflected signal RS according to a row control signal RCTRL and a phase control signal PCTRL. The pixel array 121 may include at least one unit pixel (e.g., PX of FIG. 3) for measuring the depth from the target object 200. The unit pixel PX may include at least two pixels (e.g., TAPA and TAPB of FIG. 3). For example, the unit pixel PX may be selected based on the row control signal RCTRL to generate first and second pixel signals PIX1 and PIX2 (generally indicated in FIG. 2 with "PIXs") corresponding to the reflected signal RS based on the phase control signal PCTRL. The detailed configuration of the unit pixel will be described in detail with reference to FIG. 3.

The driving control circuit 130 may generate a modulation control signal MC, the row control signal RCTRL, and the phase control signal PCTRL, in response to a request RQ for distance measurement from an external device or user interface that works with the image sensing device 100. The driving control circuit 130 may generate the modulation control signal MC for adjusting a period of the modulated signal MS in response to the request RQ, and generate the phase control signal PCTRL corresponding to a phase of the modulated signal MS. The driving control circuit 130 may set an initial phase difference (i.e., an initial phase offset) between the modulated signal MS and the phase control signal PCTRL, according to a phase offset signal OFF_PH. For example, the driving control circuit 130 may adjust (or delay) an initial phase of the phase control signal PCTRL according to the phase offset signal OFF_PH, thereby setting the initial phase offset between the modulated signal MS and the phase control signal PCTRL. Accordingly, a phase difference between the reflected signal RS and the phase control signal PCTRL may be set to a target value. The target value may be set to a value with a minimum depth error with respect to the depth phase TOF_PH, preferably 0 degree, 90 degree, 180 degree, or 270 degree.

In an embodiment, the driving control circuit 130 may include a modulation controller 132, a phase converter 134, an emitter driver 136, and a sensor driver 138.

The modulation controller 132 may generate a first driving control signal DRV_M in response to the request RQ. The modulation controller 132 may generate the first driving control signal DRV_M for the optical emitter 110 to generate the modulated signal MS having a certain period that is distinct from the ambient light. The modulation controller 132 may provide the first driving control signal DRV_M to the phase converter 134 and the emitter driver 136.

The emitter driver 136 may generate the modulation control signal MC according to the first driving control signal DRV_M. Depending on an embodiment, the emitter driver 136 may be contained in the optical emitter 110, or the optical emitter 110 may be driven under the control of the modulation controller 132.

The phase converter 134 may generate a second driving control signal DRV_DD to operate the sensor driver 138 in synchronization with a time point when the emitter driver 136 operates according to the first driving control signal DRV_M. Since the phase converter 134 has recognized the characteristic of the modulation control signal MC by using the first driving control signal DRV_M, the phase converter 134 may determine a phase corresponding to the modulated signal MS, from 0 degree, 90 degree, 180 degree, and 270 degree. For example, the phase converter 134 may adjust (e.g., shift) the phase of the modulated signal MS based on the first driving control signal DRV_M, and generate phase information PFC indicating 0 degree, 90 degree, 180 degree, and 270 degree of the modulated signal MS to output the phase information PFC by including it in the second driving control signal DRV_DD, According to the first embodiment, the phase converter 134 may change the phase information PFC according to the phase offset signal OFF_PH, to delay the initial phase of the phase control signal PCTRL by an amount of a delay time Td. As a result, the phase difference between the reflected signal RS and the phase control signal PCTRL is may be set to the target value.

The sensor driver 138 may generate the row control signal RCTRL for controlling the pixel array 121 row-by-row, according to the second driving control signal DRV_DD. For example, the sensor driver 138 may generate a first row control signal for controlling unit pixels PX arranged at a first row, and an n-th row control signal for controlling unit pixels PX arranged at an n-th row, where n being a natural number greater than 2. Further, the sensor driver 138 may generate the phase control signal PCTRL for controlling operating timings of the unit pixels PX in the pixel array 121, according to the second driving control signal DRV_DD. The sensor driver 138 may generate the phase control signal PCTRL delayed with respect to the phase of the modulated signal MS by an amount of the delay time Td corresponding to the phase offset signal OFF_PH, based on the phase information PFC included in the second driving control signal DRV_DD. The phase control signal PCTRL may include a plurality of phase transition signals (MIXA and MIXB of FIG. 3) which have different phases from each other, and respectively correspond to the pixels (TAPA and TAPB of FIG. 3) in the unit pixel PX. For example, the sensor driver 138 may drive the optical receiver 120 by sequentially generating first and second phase transition signals MIXA and MIXB, respectively corresponding to the phase 0 degree and 180 degree of the modulated signal MS, and generating the first and second phase transition signals MIXA and MIXB, respectively corresponding to the phase 90 degree and 270 degree of the modulated signal MS, based on the phase information PFC. At this time, the phase information PFC may depend on the phase offset signal OFF_PH and the initial phases of the first and second phase transition signals MIXA and MIXB may be delayed with reference to the modulated signal MS. Depending on an embodiment, the sensor driver 138 may be contained in the optical receiver 120, or the optical receiver 120 may be driven under the control of the sensor driver 138.

The image processor 140 may generate the depth information signal TOF_OUT indicating the depth from the target object 200, based on the plurality of pixel signals PIXs. For example, the image processor 140 may calculate a depth phase TOF_PH based on the first and second pixel signals PIX1 and PIX2 provided from the unit pixel PX, and calculate the depth information signal TOF_OUT corresponding to the depth phase TOF_PH. The image processor 140 may provide the depth phase TOF_PH to the offset calculating circuit 150. According to the embodiment, when the phase offset signal OFF_PH is inputted from the offset calculating circuit 150, the image processor 140 may compensate for the depth phase TOF_PH according to the phase offset signal OFF_PH, and calculate the depth information signal TOF_OUT corresponding to the compensated depth phase TOF_PH.

In an embodiment, the image processor 140 may include a signal converter 142 and a signal processor 144.

The signal converter 142 may convert the first and second pixel signals PIX1 and PIX2 provided from the pixel array 121, into data DD. For example, the first and second pixel signals PIX1 and PIX2 provided from the pixel array 121 may be data of an analog type, and the data DD converted by the signal converter 142 may be data of a digital type.

The signal processor 144 may calculate the depth phase TOF_PH by performing a preset image processing operation on the data DD transferred from the signal converter 142. Further, the signal processor 144 may generate the depth information signal TOF_OUT corresponding to the calculated depth phase TOF_PH based on a speed of light (c) and a frequency (or the period) of the modulated signal MS. The depth information signal TOF_OUT may be outputted as information on the distance (or depth) from the target object 200 to the image sensing device 100. Further, the signal processor 144 may compensate for the depth phase TOF_PH by a shifted phase in the phase converter 134 by reflecting the phase offset signal OFF_PH onto the depth phase TOF_PH. Finally, the signal processor 144 may calculate the depth information signal TOF_OUT corresponding to the compensated depth phase.

The offset calculating circuit 150 may calculate the phase offset signal OFF_PH, based on the depth phase TOF_PH that is provided from the image processor 140. The offset calculating circuit 150 may set a plurality of reference phases, select a reference phase closest to the depth phase TOF_PH among the set reference phases, and generate the phase offset signal OFF_PH representing a phase difference between the selected reference phase and the depth phase TOF_PH. For reference, the reference phases may be phases with a minimum depth error with respect to the depth phase TOF_PH, and preferably set to 0 degree, 90 degree, 180 degree, and 270 degree.

Figure 3:
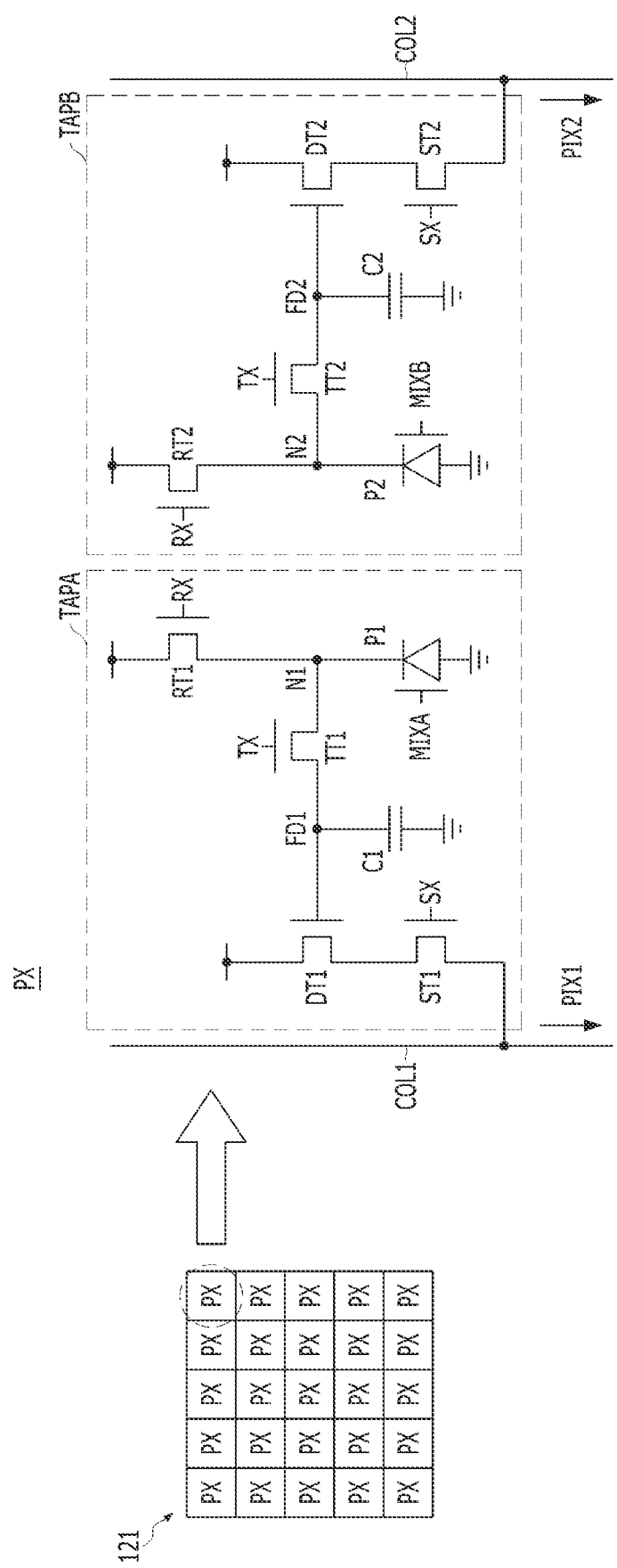
FIG. 3 is a configuration diagram illustrating a pixel array of FIG. 2, in accordance with the first embodiment of the present invention.

FIG. 3 is a configuration diagram illustrating the pixel array 121 of FIG. 2, in accordance with the first embodiment of the present disclosure.

Referring to FIG. 3, a plurality of unit pixels PX may be arranged in an array type in the pixel array 121. For example, one unit pixel PX may include a first pixel TAPA and a second pixel TAPB. The first pixel TAPA and the second pixel TAPB may be selected according to the row control signal RCTRL, and may generate the first and second pixel signals PIX1 and PIX2 corresponding to the reflected signal RS according to the phase control signal PCTRL. For reference, in FIG. 3, the row control signal RCTRL may include a reset signal RX, a transmission signal TX, and a selection signal SX, and the phase control signal PCTRL may include a first phase transition signal MIXA and a second phase transition signal MIXB. The first pixel TAPA and the second pixel TAPB may operate for respective phases of the phase control signal PCTRL.

The first pixel TAPA may generate the first pixel signal PIX1 based on the reset signal RX, the transmission signal TX, the selection signal SX and the first phase transition signal MIXA. For example, the first pixel TAPA may include a first sensing circuit P1, a first reset circuit RT1, a first transmission circuit TT1, a first charge storage circuit C1, a first driving circuit DT1, and a first selection circuit ST1. The first sensing circuit P1 may be coupled between a first node N1 and a low voltage terminal, and generate charges according to the first phase transition signal MIXA. The first sensing circuit P1 may include a photodiode. The first reset circuit RT1 may be coupled between a high voltage terminal and the first node N1, and reset the first sensing circuit P1 and the first charge storage circuit C1 according to the reset signal RX. The first transmission circuit TT1 may be coupled between the first node N1 and a first floating diffusion node FD1, and reset the first charge storage circuit C1 and transmit the charges generated from the first sensing circuit P1 to the first charge storage circuit C1, according to the transmission signal TX. The first charge storage circuit C1 may be coupled between the first floating diffusion node FD1 and the low voltage terminal. The first charge storage circuit C1 may be a parasitic capacitor. The first driving circuit DT1 may be coupled between the high voltage terminal and the first selection circuit ST1, and drive a first column line COL1 with a high voltage supplied through the high voltage terminal, according to a voltage loaded on the first floating diffusion node FD1. The first selection circuit ST1 may be coupled between the first driving circuit DT1 and the first column line COL1, and selectively couple the first driving circuit DT1 and the first column line COL1 according to the selection signal SX.

With the above structure, the first pixel TAPA operates as follows. During a reset period determined based on the reset signal RX, the first reset circuit RT1 may reset the first sensing circuit P1 and the first charge storage circuit C1. During a transmission period determined based on the transmission signal TX and the first phase transition signal MIXA, the first sensing circuit P1 may generate the charges according to the first phase transition signal MIXA, and the first charge storage circuit C1 may store the charges. During a read-out period determined based on the selection signal SX, the first driving circuit DT1 and the first selection circuit ST1 may output the first pixel signal PIX1 corresponding to the charges, through the first column line COL1 to the image processor 140.

The second pixel TAPB may generate the second pixel signal PX2 based on the reset signal RX, the transmission signal TX, the selection signal SX and the second phase transition signal MIXB. For example, the second pixel TAPB may include a second sensing circuit P2, a second reset circuit RT2, a second transmission circuit TT2, a second charge storage circuit C2, a second driving circuit DT2, and a second selection circuit ST2. Since the configuration and operation of the second pixel TAPB is substantially the same as the first pixel TAPA, a detailed description will be omitted.

FIG. 4 is a timing diagram for describing an operation of an image sensing device using a TOF scheme. FIG. 4 shows a case where the phase offset signal OFF_PH provided from the offset calculating circuit 150 is not reflected onto the depth phase TOF_PH in the signal processor 144.

Referring to FIG. 4, the optical emitter 110 outputs the modulated signal MS that is toggling with a certain period, to the target object 200, and the optical receiver 120 receives the reflected signal RS reflected from the target object 200. At this time, the modulated signal MS and the reflected signal RS may have a phase difference ($\varphi$) corresponding to a TOF of the signals.

The phase converter 134 shifts the phase of the modulated signal MS with a gap of 90 degree to generate the phase information PFC indicating 0 degree, 90 degree, 180 degree, and 270 degree of the modulated signal MS. The sensor driver 138 generates the phase control signal PCTRL corresponding to the phase of the modulated signal MS. The sensor driver 138 drives the optical receiver 120 by sequentially generating the first and second phase transition signals MIXA and MIXB, respectively corresponding to the phase 0 degree and 180 degree of the modulated signal MS, and generating the first and second phase transition signals MIXA and MIXB, respectively corresponding to the phase 90 degree and 270 degree of the modulated signal MS.

The amount (the amount of charge generated by light volume) of the reflected signal RS received in response to the sequentially inputted first and second phase transition signals MIXA and MIXB are Q1, Q2, Q3, and Q4. At this time, the amounts Q1 and Q3 of the reflected signal RS may correspond to the first pixel signal PIX1 of FIG. 3, the amounts Q2 and Q4 of the reflected signal RS may correspond to the second pixel signal PIX2 of FIG. 3. The image processor 140 calculates the depth phase TOF_PH based on the first and second pixel signals PIX1 and PIX2 provided from the unit pixel PX, and calculates the depth information signal TOF_OUT corresponding to the depth phase TOF_PH.

Figure 5A:
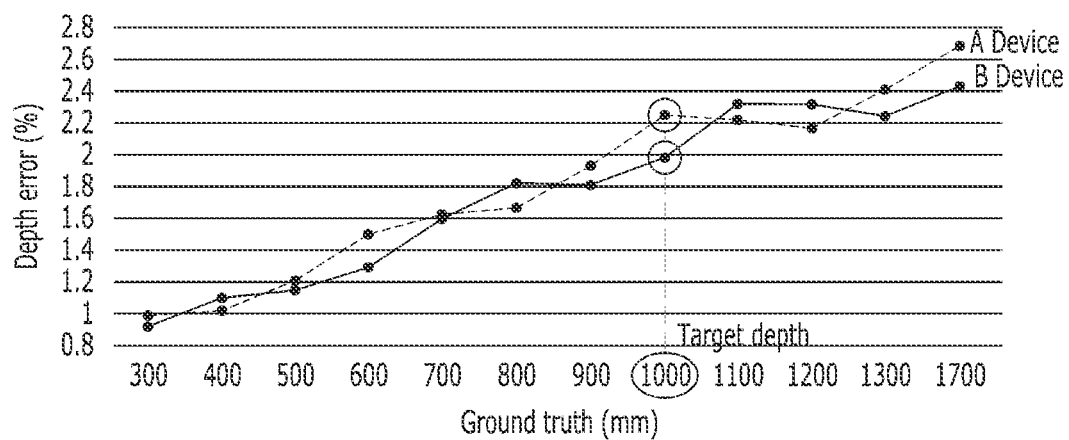
FIG. 5A is a graph showing a depth error generated according to a depth in an image sensing device.

On the other hand, in the image sensing device that acquires the depth information in a TOF scheme, the depth error may be increased as the depth gets deeper, i.e., the distance gets farther. In an ideal case, the further away the target object 200, there may be a linear increase in the depth error, but the non-linear depth error occurs in the respective image sensing devices (A, B) due to the performance of the optical receiver and transmitter, mismatches of pixels in the unit pixel, and mismatches of in-pixel devices (e.g., transistors). For example, as shown in FIG. 5A, if the target depth is 1000 mm, the depth error of the image sensing device A is greater than that of the image sensing device B. As a result, it is difficult to compensate for depth errors collectively, and there is a difficulty in calculating and reflecting depth errors whenever the depth information was obtained for each device.

Figure 5B:
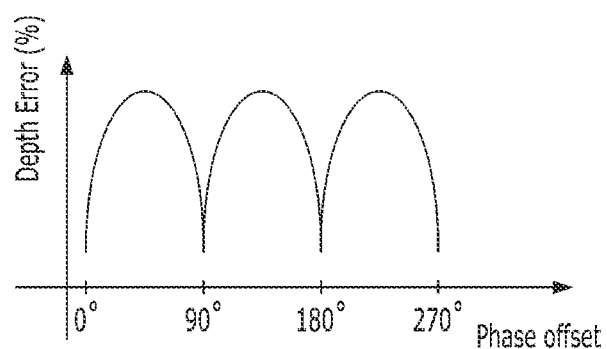
FIG. 5B is a graph showing a depth error generated according to a phase difference between a reflected signal and a phase control signal in an image sensing device.

Furthermore, when generating the depth information signal TOF_OUT using the first and second pixel signals PIX1 and PIX2 corresponding to the amounts Q1, Q2, Q3 and Q4 of the reflected signal RS, the performance of the image processor may be most optimized when the amounts Q1, Q2, Q3 and Q4 of the reflected signal RS respectively occupy 50:50 or 100:0 in an activation section of the phase control signal PCTRL, in a view of a signal-to-noise ratio (SNR). That is, as shown in FIG. 5B, in each point where a phase difference (i.e., a phase offset) between the reflected signal RS and the phase control signal PCTRL becomes 0 degree, 90 degree, 180 degree, or 270 degree, the SNR becomes 50:50 or 100:0, resulting in a minimum depth error.

Accordingly, in accordance with the first embodiment of the present invention, using the phase offset signal OFF_PH generated by the offset calculating circuit 150, the driving control circuit 130 may delay the initial phase of the phase control signal PCTRL to thereby set the phase difference between the reflected signal RS and the phase control signal PCTRL to become 0 degree, 90 degree, 180 degree, or 270 degree, resulting in a minimum depth error. That is, in the first embodiment, the offset calculating circuit 150 may set 0 degree, 90 degree, 180 degree, and 270 degree as first to fourth reference phases, select a reference phase closest to the depth phase TOF_PH among the first to fourth reference phases, and generate the phase offset signal OFF_PH representing a phase difference between the selected reference phase and the depth phase TOF_PH.

Figure 6A:
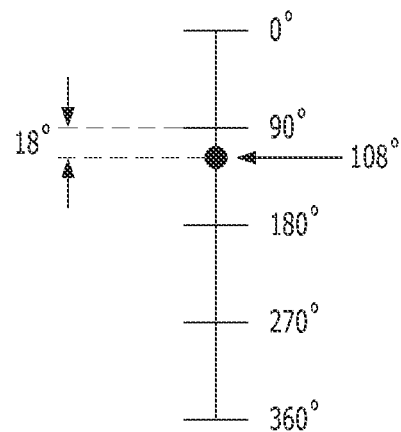
FIGS. 6A and 6B are diagrams illustrating an offset calculating circuit in accordance with an embodiment of the present invention.
Figure 6B:
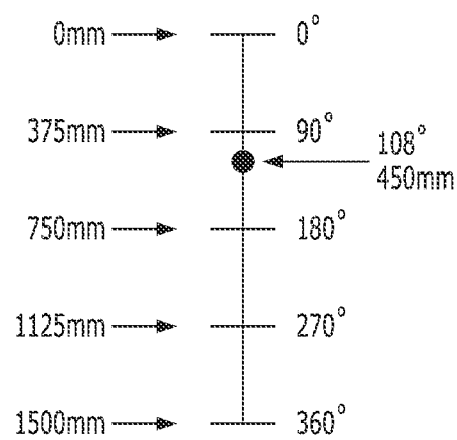

For reference, referring to FIG. 6A, the depth phase TOF_PH provided from the image processor 140 in a default state on which the phase offset signal OFF_PH is not reflected, is set to 108 degree. At this time, since the second reference phase of 90 degree, among the first to fourth reference phases of 0 degree, 90 degree, 180 degree, and 270 degree, is closest to the depth phase TOF_PH of 108 degree, the offset calculating circuit 150 may generate the phase offset signal OFF_PH representing a phase difference (i.e., 18 degree) between the second reference phase of 90 degree and the depth phase TOF_PH of 108 degree. Subsequently, the driving control circuit 130 may delay the initial phase of the phase control signal PCTRL according to the phase offset signal OFF_PH to thereby set the phase difference between the reflected signal RS and the phase control signal PCTRL to 90 degree. As a result, the depth error may be minimized.

Further, in accordance with the first embodiment of the present invention, when the phase offset signal OFF_PH is inputted from the offset calculating circuit 150, the image processor 140 may compensate for the depth phase TOF_PH according to the phase offset signal OFF_PH, and calculate the depth information signal TOF_OUT corresponding to the compensated depth phase TOF_PH. For example, if the image sensing device 100 can measure the depth from 0 to 1500 mm, the depths corresponding to the first to fourth reference phases of 0 degrees, 90 degrees, 180 degrees, and 270 degrees may be set to 375 mm, 750 mm, 1125 mm and 1500 mm, respectively. The image processor 140 may reflect the phase offset signal OFF_PH (i.e., 18 degree) onto the depth phase TOF_PH (ideally 90 degree), and thus, calculate the depth information signal TOF_OUT having a depth value of 450 mm (i.e., 1500*108/360) corresponding to 108 degree.

Figure 7:
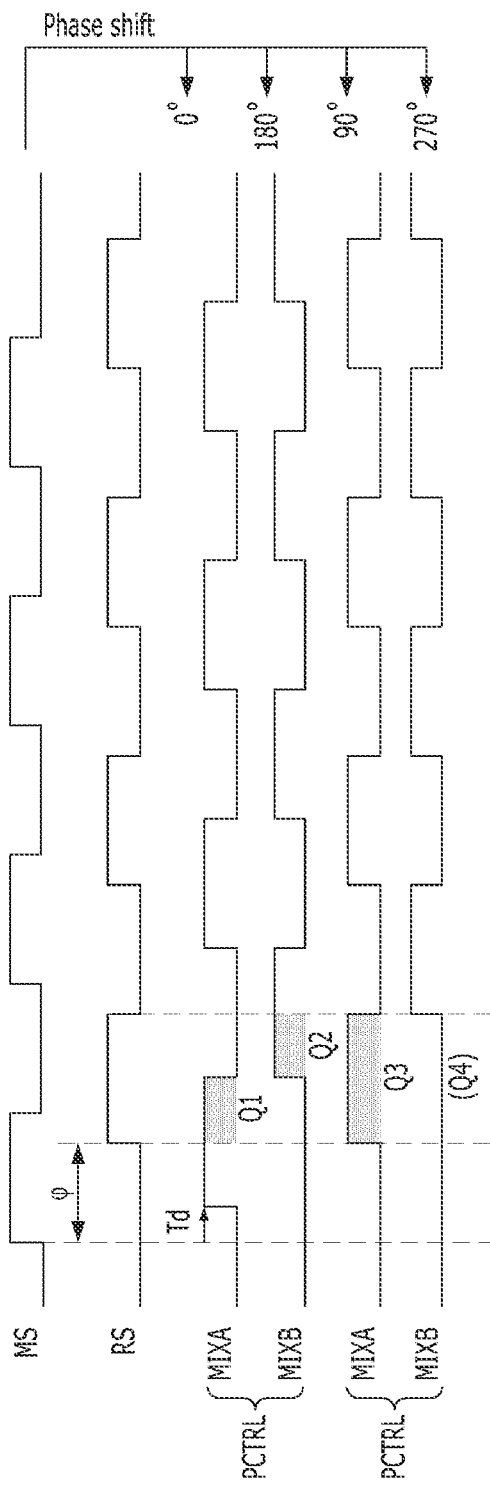
FIG. 7 is a timing diagram for describing an operation of the image sensing device of FIG. 2 in accordance with the first embodiment of the present invention.

FIG. 7 is a timing diagram for describing an operation of the image sensing device 100 of FIG. 2, in accordance with the first embodiment of the present invention.

Referring to FIG. 7, the optical emitter 110 outputs the modulated signal MS that is toggling with a certain period, to the target object 200, and the optical receiver 120 receives the reflected signal RS reflected from the target object 200. The modulated signal MS and the reflected signal RS may have a phase difference ($\varphi$) corresponding to a TOF of the signals.

The phase converter 134 shifts the phase of the modulated signal MS with a gap of 90 degree to generate the phase information PFC indicating 0 degree, 90 degree, 180 degree, and 270 degree of the modulated signal MS. The phase converter 134 adjusts the phase information PFC according to the phase offset signal OFF_PH for the sensor driver 138 to delay the phase of the phase control signal PCTRL. For example, when the phase offset signal OFF_PH is calculated as 18 degree, the phase converter 134 adjusts the phase information PFC to delay the phase of the phase control signal PCTRL by the delay time Td corresponding to the phase offset signal OFF_PH, e.g., the 18 degree.

The sensor driver 138 generates the phase control signal PCTRL corresponding to the phase of the modulated signal MS, based on the phase information PFC. The sensor driver 138 drives the optical receiver 120 by sequentially generating the first and second phase transition signals MIXA and MIXB, respectively corresponding to the phase 0 degree and 180 degree of the modulated signal MS, and generating the first and second phase transition signals MIXA and MIXB, respectively corresponding to the phase 90 degree and 270 degree of the modulated signal MS. At this time, the sensor driver 138 may delay the initial phase of the first and second phase transition signals MIXA and MIXB by the delay time Td corresponding to the phase offset signal OFF_PH. Thus, the phase difference between the reflected signal RS and the phase control signal PCTRL may be set to any of 0 degree, 90 degree, 180 degree, and 270 degree. As a result, the amounts Q1, Q2, Q3 and Q4 of the reflected signal RS respectively occupy 50:50 or 100:0 in an activation section of the phase control signal PCTRL, thereby maximizing the SNR to minimize the depth error.

The image processor 140 calculates the depth phase TOF_PH based on the first and second pixel signals PIX1 and PIX2 provided from the unit pixel PX, and calculates the depth information signal TOF_OUT corresponding to the depth phase TOF_PH. When the phase offset signal OFF_PH is inputted from the offset calculating circuit 150, the image processor 140 may compensate for the depth phase TOF_PH according to the phase offset signal OFF_PH, and calculate the depth information signal TOF_OUT corresponding to the compensated depth phase TOF_PH.

Hereinafter, referring to FIGS. 2 to 8, an operation of the image sensing device 100 in accordance with an embodiment of the present invention will be described.

Figure 8:
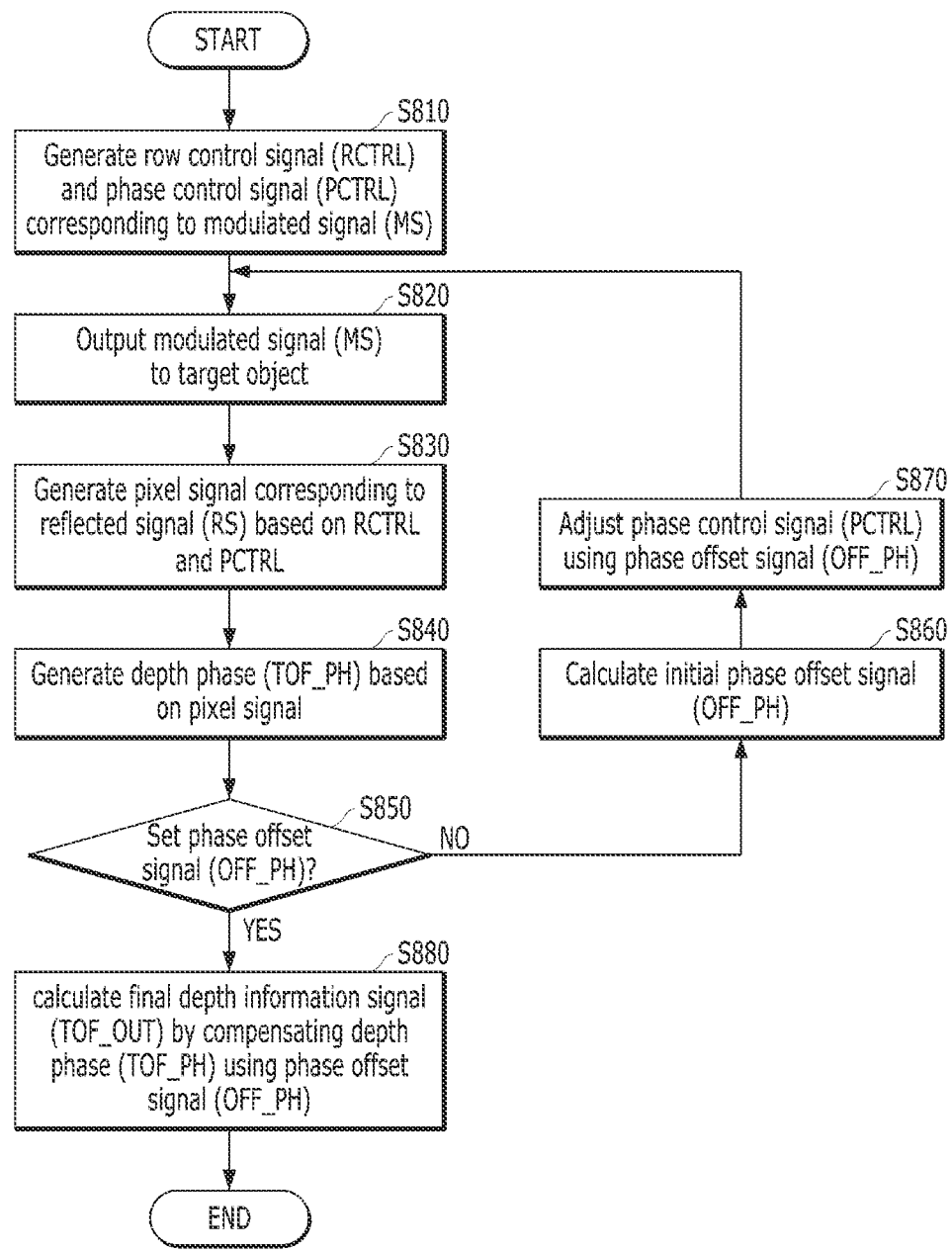
FIG. 8 is a flow chart for describing an operation of an image sensing device in accordance with an embodiment of the present invention.

FIG. 8 is a flow chart for describing an operation of the image sensing device 100 in accordance with an embodiment of the present invention.

Referring to FIG. 8, first, the depth phase TOF_PH is outputted and provided from the image processor 140 in a default state on which the phase offset signal OFF_PH is not reflected.

In an embodiment, the driving control circuit 130 may generate the modulation control signal MC for adjusting a period of the modulated signal MS in response to the request RQ, and generate the row control signal RCTRL and the phase control signal PCTRL corresponding to a phase of the modulated signal MS (at S810). The optical emitter 110 may output the modulated signal MS to the target object 200 according to the modulation control signal MC (at S820). The pixel array 121 in the optical receiver 120 may generate the pixel signals PIXs corresponding to the reflected signal RS reflected from the target object 200, according to the row control signal RCTRL and the phase control signal PCTRL (S830). The image processor 140 may calculate the depth phase TOF_PH based on the pixel signals PIXs (at S840).

When the phase offset signal OFF_PH is not set ("NO" of S850), the offset calculating circuit 150 may calculate the phase offset signal OFF_PH, based on the depth phase TOF_PH that is provided from the image processor 140 (at S860). That is, the offset calculating circuit 150 may set a plurality of reference phases (e.g., 0 degree, 90 degree, 180 degree, and 270 degree), select a reference phase closest to the depth phase TOF_PH among the set reference phases, and generate the phase offset signal OFF_PH representing a phase difference between the selected reference phase and the depth phase TOF_PH. The driving control circuit 130 may adjust the initial phase of the phase control signal PCTRL according to the phase offset signal OFF_PH (at S870).

Thereafter, the optical emitter 110 may output the modulated signal MS to the target object 200 according to the modulation control signal MC (at S820). The pixel array 121 in the optical receiver 120 may generate the pixel signals PIXs corresponding to the reflected signal RS reflected from the target object 200, according to the row control signal RCTRL and the phase control signal PCTRL (S830). At this time, since the phase difference between the reflected signal RS and the phase control signal PCTRL is set to any of 0 degree, 90 degree, 180 degree, and 270 degree, the SNR may be maximized, and the depth error may be minimized.

The image processor 140 may calculate the depth phase TOF_PH based on the pixel signals PIXs (at S840). When the phase offset signal OFF_PH is set ("YES" of S850), the image processor 140 may compensate for the depth phase TOF_PH according to the phase offset signal OFF_PH, and calculate the depth information signal TOF_OUT corresponding to the compensated depth phase TOF_PH (at S880).

In the first embodiment, though a case where the phase of the phase control signal PCTRL is adjusted according to the phase offset signal OFF_PH is described, the present invention is not limited thereto. Hereinafter, referring to FIGS. 9 and 10, a case where a phase of the modulated signal MS is adjusted according to the phase offset signal OFF_PH will be described.

Figure 9:
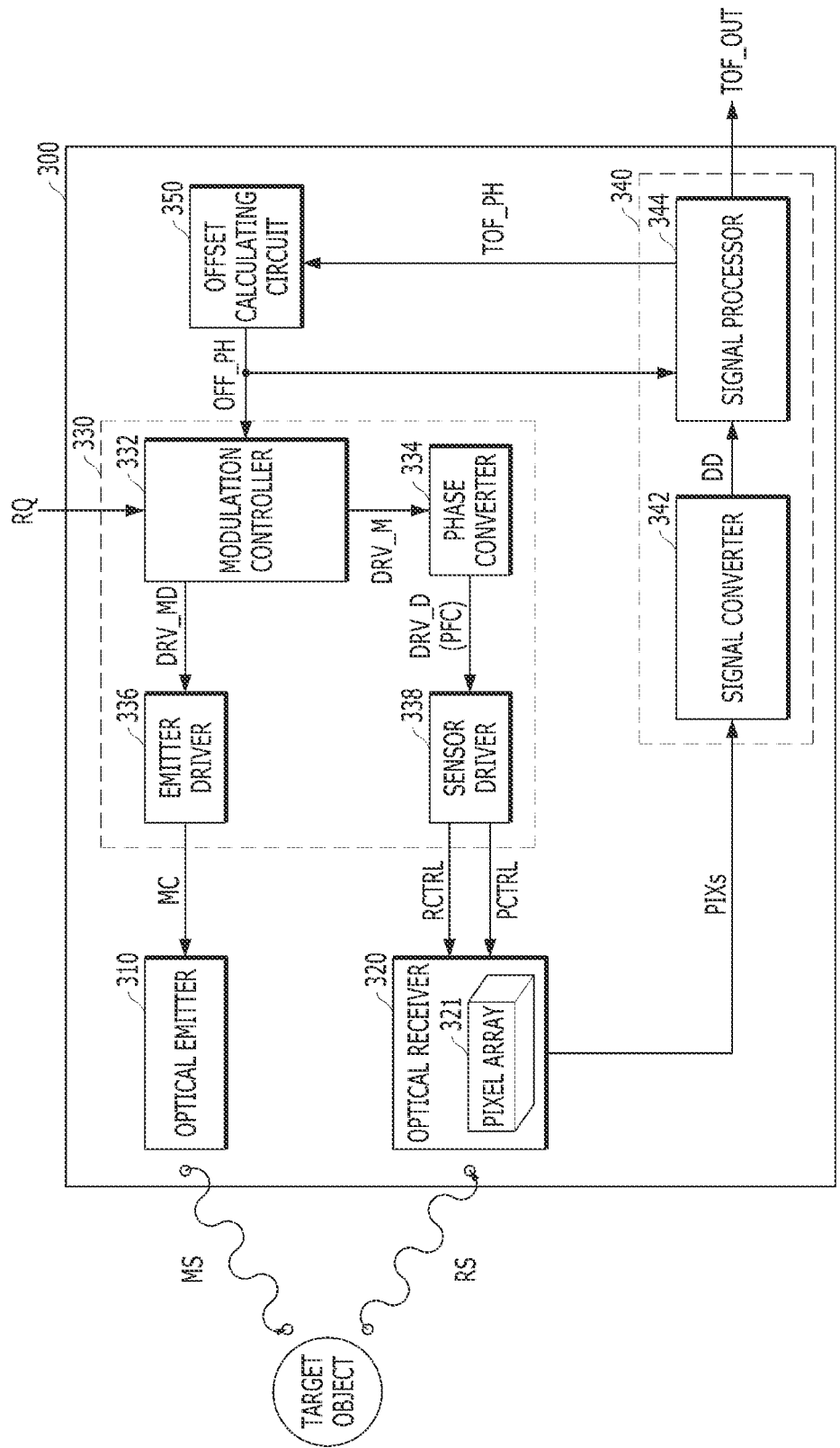
FIG. 9 is a block diagram illustrating an image sensing device using a TOF scheme in accordance with a second embodiment of the present invention.

FIG. 9 is a block diagram illustrating an image sensing device 300 using a TOF scheme in accordance with a second embodiment of the present invention.

Referring to FIG. 9, the image sensing device 300 may include an optical emitter 310, an optical receiver 320, a driving control circuit 330, an image processor 340, and an offset calculating circuit 350. The optical emitter 310, the optical receiver 320, the image processor 340, and the offset calculating circuit 350 may have substantially the same configuration as those of FIG. 2.

The driving control circuit 330 may generate a modulation control signal MC for adjusting a period of a modulated signal MS, and generate a phase control signal PCTRL corresponding to a phase of the modulated signal MS, in response to a request RQ. The driving control circuit 330 may set an initial phase difference (i.e., an initial phase offset) between the modulated signal MS and the phase control signal PCTRL, according to a phase offset signal OFF_PH. In accordance with the second embodiment, the driving control circuit 330 may generate the modulation control signal MC to adjust (or delay) an initial phase of the modulated signal MS, according to the phase offset signal OFF_PH. Accordingly, a phase difference between the reflected signal RS and the phase control signal PCTRL may be set to a target value. The target value may be set to a value with a minimum depth error with respect to the depth phase TOF_PH, preferably 0 degree, 90 degree, 180 degree, or 270 degree.

In detail, the driving control circuit 330 may include a modulation controller 332, a phase converter 334, an emitter driver 336, and a sensor driver 338.

The modulation controller 332 may generate a first driving control signal DRV_M for the optical emitter 310 to generate the modulated signal MS having a certain period that is distinct from the ambient light. The modulation controller 332 may provide the first driving control signal DRV_M to the phase converter 334. In accordance with the second embodiment, the modulation controller 332 may generate an adjusted first driving control signal DRV_MD by adjusting the first driving control signal DRV_M according to the phase offset signal OFF_PH. The modulation controller 332 may delay the first driving control signal DRV_M by an amount of a delay time Td according to the phase offset signal OFF_PH to generate the delayed signal as the adjusted first driving control signal DRV_MD. The modulation controller 332 may provide the adjusted first driving control signal DRV_MD to the emitter driver 336.

The emitter driver 336 may generate the modulation control signal MC according to the adjusted first driving control signal DRV_MD, for the optical emitter 310 to delay the initial phase of the modulated signal MS. Accordingly, a phase difference between the reflected signal RS and the phase control signal PCTRL may be set to a target value.

The phase converter 334 may generate a second driving control signal DRV_D to operate the sensor driver 338 in synchronization with a time point when the emitter driver 336 is supposed to operate according to the first driving control signal DRV_M. The phase converter 334 may adjust (e.g., shift) the phase of the modulated signal MS based on the first driving control signal DRV_M, and generate phase information PFC indicating 0 degree, 90 degree, 180 degree, and 270 degree of the modulated signal MS, of which the initial phase is not adjusted or delayed, to output the phase information PFC by including it in the second driving control signal DRV_D.

The sensor driver 338 may generate the row control signal RCTRL for controlling a pixel array 321 row-by-row, and the phase control signal PCTRL, according to the second driving control signal DRV_D.

Figure 10:
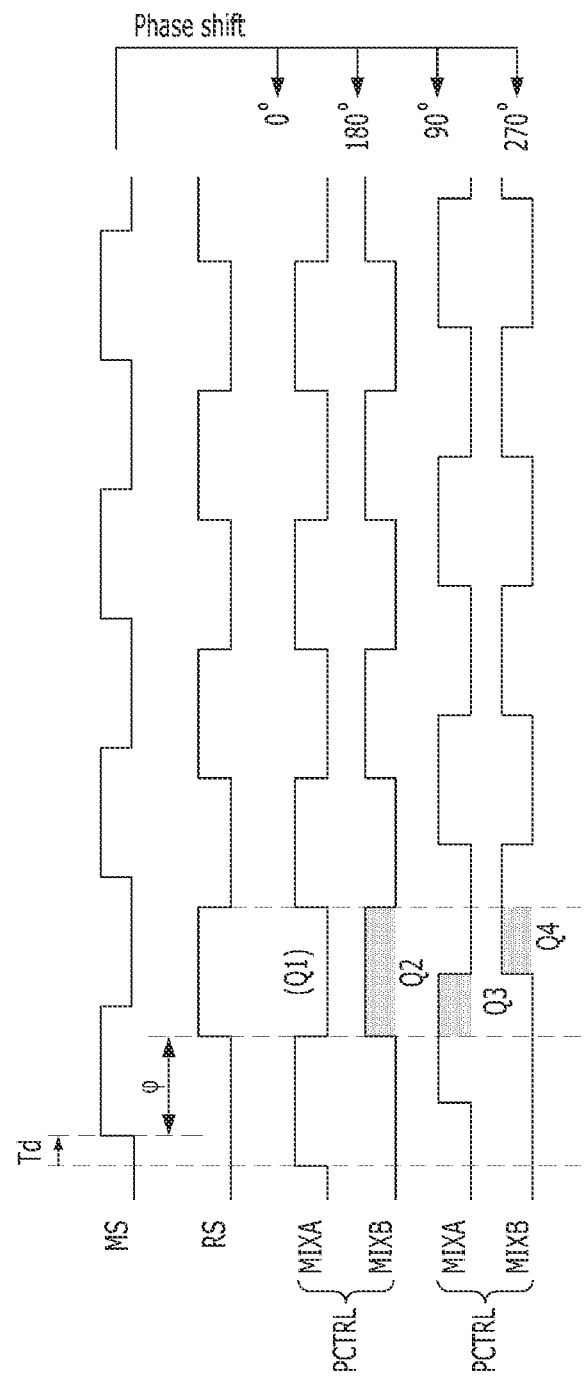
FIG. 10 is a timing diagram for describing an operation of the image sensing device of FIG. 9, in accordance with the second embodiment of the present invention.

FIG. 10 is a timing diagram for describing an operation of the image sensing device 300 of FIG. 9, in accordance with the second embodiment of the present invention.

Referring to FIG. 10, the driving control circuit 330 may generate the modulation control signal MC according to the phase offset signal OF_PH, to delay the initial phase of the modulated signal MS by the amount of the delay time Td. Thus, the optical emitter 310 outputs the modulated signal MS which is toggling with a certain period and whose initial phase is delayed by the delay time Td corresponding to the phase offset signal OFF_PH, to a target object. At this time, the modulated signal MS and the reflected signal RS may have a phase difference (φ) corresponding to a TOF of the signals.

The phase converter 334 shifts the phase of the modulated signal MS with a gap of 90 degree to generate the phase information PFC indicating 0 degree, 90 degree, 180 degree, and 270 degree of the modulated signal MS, of which the initial phase is not delayed.

The sensor driver 338 generates the phase control signal PCTRL corresponding to the phase of the modulated signal MS based on the phase information PFC. The sensor driver 338 drives the optical receiver 320 by sequentially generating the first and second phase transition signals MIXA and MIXB, respectively corresponding to the phase 0 degree and 180 degree of the modulated signal MS, and generating the first and second phase transition signals MIXA and MIXB, respectively corresponding to the phase 90 degree and 270 degree of the modulated signal MS.

At this time, as the initial phase of the modulated signal MS is delayed by the amount of the delay time Td, an initial phase of the reflected signal RS is also delayed. Thus, the phase difference between the reflected signal RS and the phase control signal PCTRL may be set to any of 0 degree, 90 degree, 180 degree, and 270 degree. As a result, the amounts Q1, Q2, Q3 and Q4 of the reflected signal RS respectively occupy 50:50 or 100:0 in an activation section of the phase control signal PCTRL, thereby maximizing the SNR to minimize the depth error.

The image processor 340 calculates a depth phase TOF_PH based on first and second pixel signals PIX1 and PIX2 provided from a unit pixel PX, and calculates a depth information signal TOF_OUT corresponding to the depth phase TOF_PH. When the phase offset signal OFF_PH is inputted from the offset calculating circuit 350, the image processor 340 may compensate for the depth phase TOF_PH according to the phase offset signal OFF_PH, and calculate the depth information signal TOF_OUT corresponding to the compensated depth phase TOF_PH.

Hereinafter, referring to FIGS. 11 and 12, a case where both of the phases of the modulated signal MS and the phase control signal PCTRL are adjusted according to the phase offset signal OFF_PH will be described.

Figure 11:
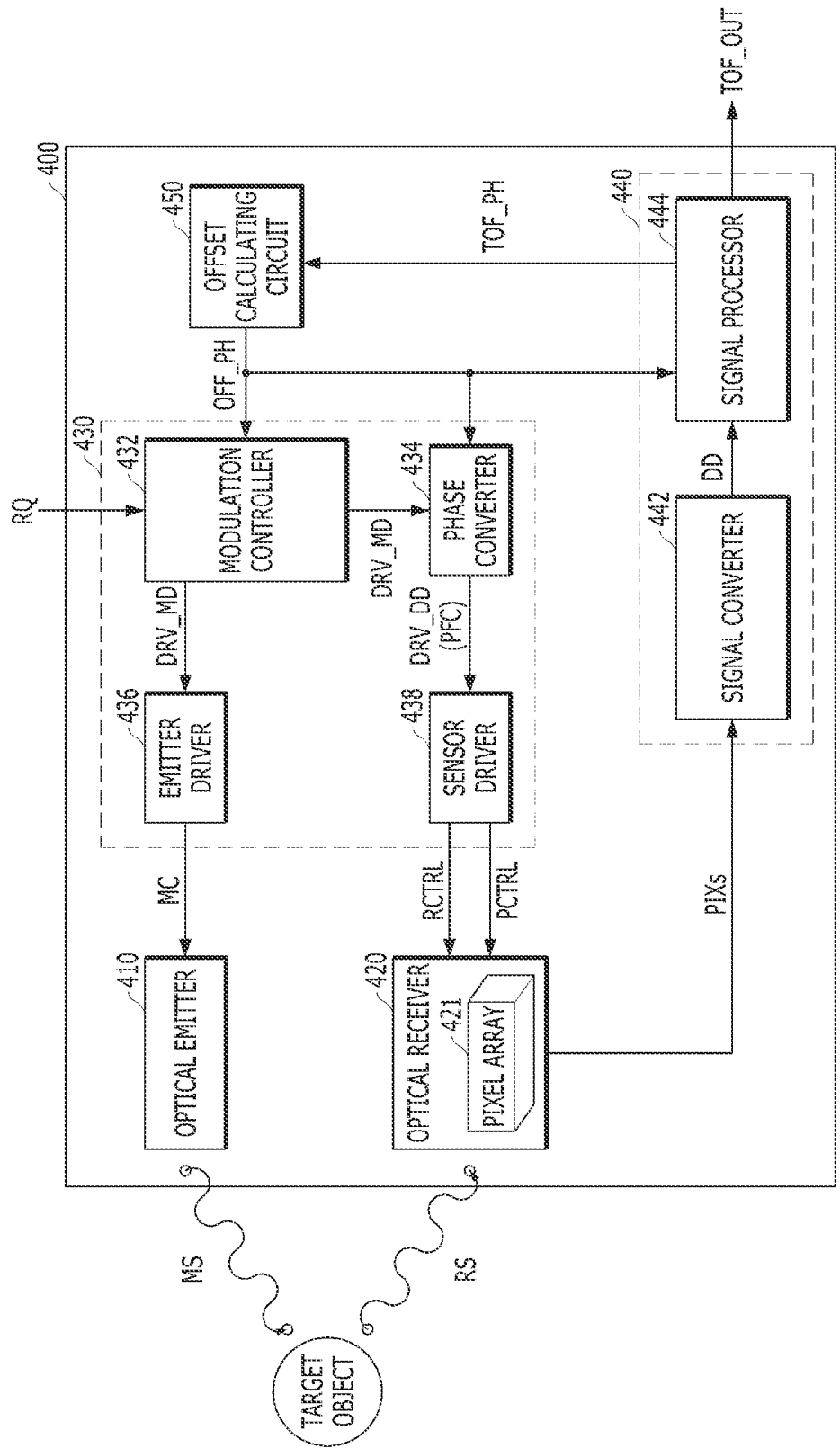
FIG. 11 is a block diagram illustrating an image sensing device using a TOF scheme in accordance with a third embodiment of the present invention.

FIG. 11 is a block diagram illustrating an image sensing device 400 using a TOF scheme in accordance with a third embodiment of the present invention.

Referring to FIG. 11, the image sensing device 400 may include an optical emitter 410, an optical receiver 420, a driving control circuit 430, an image processor 440, and an offset calculating circuit 450. The optical emitter 410, the optical receiver 420, the image processor 440, and the offset calculating circuit 450 may have substantially the same configuration as those of FIG. 2.

The driving control circuit 430 may generate a modulation control signal MC for adjusting a period of a modulated signal MS, and generate a phase control signal PCTRL corresponding to a phase of the modulated signal MS, in response to a request RQ. The driving control circuit 430 may set an initial phase difference (i.e., an initial phase offset) between the modulated signal MS and the phase control signal PCTRL, according to a phase offset signal OFF_PH. In accordance with the third embodiment, the driving control circuit 430 may generate the modulation control signal MC to adjust (or delay) both initial phases of the modulated signal MS and the phase control signal PCTRL, according to the phase offset signal OFF_PH. Accordingly, a phase difference between the reflected signal RS and the phase control signal PCTRL may be set to a target value, i.e., any of 0 degree, 90 degree, 180 degree, and 270 degree.

In detail, the driving control circuit 430 may include a modulation controller 432, a phase converter 434, an emitter driver 436, and a sensor driver 438.

The modulation controller 432 may generate a first driving control signal DRV_MD for the optical emitter 410 to generate the modulated signal MS having a certain period that is distinct from the ambient light. In accordance with the third embodiment, the modulation controller 432 may adjust the first driving control signal DRV_MD to delay the initial phase of the modulated signal MS by an amount of a first delay time Td1 or a coarse delay time according to the phase offset signal OFF_PH. The modulation controller 432 may provide the first driving control signal DRV_MD to the phase converter 434 and the emitter driver 436.

The emitter driver 436 may generate the modulation control signal MC according to the first driving control signal DRV_MD, for the optical emitter 410 to delay the initial phase of the modulated signal MS by the amount of the first delay time Td1.

The phase converter 434 may generate a second driving control signal DRV_DD to operate the sensor driver 438 in synchronization with a time point when the emitter driver 436 operates according to the first driving control signal DRV_MD. The phase converter 434 may adjust (e.g., shift) the phase of the modulated signal MS by the amount of the first delay time Td1 based on the first driving control signal DRV_MD and the phase offset signal OFF_PH, and generate phase information PFC indicating 0 degree, 90 degree, 180 degree, and 270 degree of the modulated signal MS with a second delay time Td2 or a fine delay time corresponding to the phase offset signal OFF_PH reflected to output the phase information PFC by including it in the second driving control signal DRV_DD. In accordance with the third embodiment, the phase converter 434 may convert the phase information PFC according to the phase offset signal OFF_PH, to delay the initial phase of the phase control signal PCTRL by an amount of the second delay time Td2.

The sensor driver 438 may generate the row control signal RCTRL for controlling a pixel array 421 row-by-row, and the phase control signal PCTRL, according to the second driving control signal DRV_DD. The sensor driver 438 may generate the phase control signal PCTRL corresponding to the phase of the modulated signal MS, based on the phase information PFC included in the second driving control signal DRV_DD. At this time, the phase information PFC may depend on the phase offset signal OFF_PH and the initial phase of the phase control signal PCTRL may be delayed by the amount of the second delay time Td2 with respect to the modulated signal MS.

For reference, in accordance with the third embodiment, a difference between the delayed initial phase of the modulated signal MS and the delayed initial phase of the phase control signal PCTRL may correspond to the delayed initial phase of the phase control signal PCTRL of the first embodiment, or the delayed initial phase of the modulated signal MS of the second embodiment.

Figure 12:
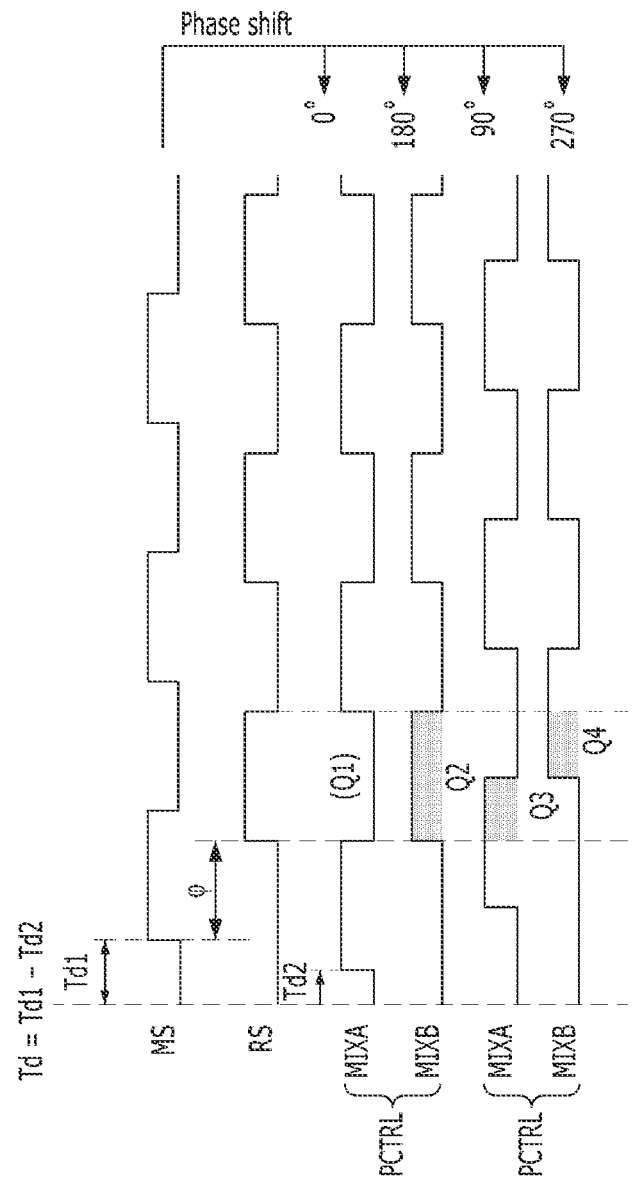
FIG. 12 is a timing diagram for describing an operation of the image sensing device of FIG. 11, in accordance with the third embodiment of the present invention.

FIG. 12 is a timing diagram for describing an operation of the image sensing device 400 of FIG. 11, in accordance with the third embodiment of the present invention.

Referring to FIG. 12, the driving control circuit 430 may generate the modulation control signal MC according to the phase offset signal OFF_PH, to delay the initial phase of the modulated signal MS by the amount of the first delay time Td1. Thus, the optical emitter 410 outputs the modulated signal MS which is toggling with a certain period and whose initial phase is delayed by the first delay time Td1 corresponding to the phase offset signal OFF_PH, to a target object. At this time, the modulated signal MS and the reflected signal RS may have a phase difference (φ) corresponding to a TOF of the signals.

The phase converter 434 generates the phase information PFC indicating 0 degree, 90 degree, 180 degree, and 270 degree of the modulated signal MS with the second delay time Td2 corresponding to the phase offset signal OFF_PH reflected. The phase converter 434 adjusts the phase information PFC according to the phase offset signal OFF_PH for the sensor driver 438 to delay the initial phase of the phase control signal PCTRL by the second delay time Td2 corresponding to the phase offset signal OFF_PH.

The sensor driver 438 generates the phase control signal PCTRL corresponding to the phase of the modulated signal MS, based on the phase information PFC. The sensor driver 438 drives the optical receiver 420 by sequentially generating the first and second phase transition signals MIXA and MIXB, respectively corresponding to the phase 0 degree and 180 degree of the modulated signal MS, and generating the first and second phase transition signals MIXA and MIXB, respectively corresponding to the phase 90 degree and 270 degree of the modulated signal MS. At this time, the sensor driver 438 may delay the initial phase of the first and second phase transition signals MIXA and MIXB by the second delay time Td2 corresponding to the phase offset signal OFF_PH.

At this time, the first delay time Td1 may be defined as a coarse delay time, and the second delay time Td2 may be defined as a fine delay time. That is, the initial phase of the modulated signal MS may be coarsely adjusted using the first delay time Td1, and then the initial phase of the phase control signal PCTRL may be finely adjusted using the second delay time Td2. A difference between the first delay time Td1 and the second delay time Td2 may correspond to the delay time Td of the first embodiment or the second embodiment, Thus, the phase difference between the reflected signal RS and the phase control signal PCTRL may be set to any of 0 degree, 90 degree, 180 degree, and 270 degree. As a result, the amounts Q1, Q2, Q3 and Q4 of the reflected signal RS respectively occupy 50:50 or 100:0 in an activation section of the phase control signal PCTRL, thereby maximizing the SNR to minimize the depth error.

The image processor 440 calculates a depth phase TOF_PH based on first and second pixel signals PIX1 and PIX2 provided from a unit pixel PX, and calculates a depth information signal TOF_OUT corresponding to the depth phase TOF_PH. When the phase offset signal OFF_PH is inputted from the offset calculating circuit 450, the image processor 440 may compensate for the depth phase TOF_PH according to the phase offset signal OFF_PH, and calculate the depth information signal TOF_OUT corresponding to the compensated depth phase TOF_PH.

As described above, in accordance with the embodiments of the present invention, the image sensing device using the TOF scheme for acquiring the depth information may set an initial phase offset between the modulated signal and the phase control signal based on the depth information. Further, the image sensing device may compensate for the acquired depth information using the initial phase offset, thereby minimizing the depth error and obtaining accurate depth information.

Moreover, various embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

It should be noted that although the technical spirit of the disclosure has been described in connection with preferred embodiments thereof, this is merely for description purposes and should not be interpreted as limiting. It should be appreciated by one of ordinary skill in the art that various changes may be made thereto without departing from the technical spirit of the disclosure and the following claims.

For example, for the logic gates and transistors provided as examples in the above-described embodiments, different positions and types may be implemented depending on the polarity of the input signal.

What is claimed is:

1. An image sensing device, comprising:
   an optical emitter suitable for outputting a modulated signal to a target object;
   an optical receiver suitable for generating, according to a phase control signal, pixel signals corresponding to a reflected signal from the target object;
   an image processor suitable for calculating a depth phase based on the pixel signals and compensating for the depth phase according to a phase offset signal to output a depth information signal;
   a driving control circuit suitable for generating the phase control signal corresponding to a phase of the modulated signal and setting an initial phase difference between the modulated signal and the phase control signal according to the phase offset signal; and
   an offset calculating circuit suitable for setting a plurality of reference phases, selecting a reference phase closest to the depth phase among the set reference phases and generating the phase offset signal representing a phase difference between the selected reference phase and the depth phase, wherein the driving control circuit includes:
a modulation controller suitable for generating a first driving control signal for the optical emitter to generate the modulated signal having a certain period that is distinct from an ambient light, in response to a request; and
a phase converter suitable for generating phase information for the phase control signal by adjusting the phase of the modulated signal based on the first driving control signal and the phase offset signal to delay an initial phase of the phase control signal.

2. The image sensing device of claim 1, wherein the reference phases include 0 degree, 90 degree, 180 degree and 270 degree.

3. The image sensing device of claim 1, wherein the driving control circuit sets the initial phase difference by delaying the initial phase of the phase control signal according to the phase offset signal.

4. An image sensing device, comprising:
an optical emitter suitable for outputting a modulated signal to a target object;
an optical receiver suitable for generating, according to a phase control signal, pixel signals corresponding to a reflected signal from the target object;
an image processor suitable for calculating a depth phase based on the pixel signals and compensating for the depth phase according to a phase offset signal to output a depth information signal;
a driving control circuit suitable for generating the phase control signal corresponding to a phase of the modulated signal and setting an initial phase difference between the modulated signal and the phase control signal according to the phase offset signal; and
an offset calculating circuit suitable for setting a plurality of reference phases, selecting a reference phase closest to the depth phase among the set reference phases and generating the phase offset signal representing a phase difference between the selected reference phase and the depth phase,
wherein the driving control circuit includes:
a modulation controller suitable for generating a first driving control signal for the optical emitter to generate the modulated signal having a certain period that is distinct from an ambient light, in response to a request, and adjusting the first driving control signal according to the phase offset signal to delay an initial phase of the modulated signal; and
a phase converter suitable for generating phase information for the phase control signal by adjusting the phase of the modulated signal based on the first driving control signal that is not adjusted.

5. The image sensing device of claim 4, wherein the driving control circuit sets the initial phase difference by delaying the initial phase of the modulated signal according to the phase offset signal.

6. An image sensing device, comprising:
an optical emitter suitable for outputting a modulated signal to a target object;
an optical receiver suitable for generating, according to a phase control signal, pixel signals corresponding to a reflected signal from the target object;
an image processor suitable for calculating a depth phase based on the pixel signals and compensating for the depth phase according to a phase offset signal to output a depth information signal;
a driving control circuit suitable for generating the phase control signal corresponding to a phase of the modulated signal and setting an initial phase difference between the modulated signal and the phase control signal according to the phase offset signal; and
an offset calculating circuit suitable for setting a plurality of reference phases, selecting a reference phase closest to the depth phase among the set reference phases and generating the phase offset signal representing a phase difference between the selected reference phase and the depth phase,
wherein the driving control circuit includes:
a modulation controller suitable for generating a first driving control signal for the optical emitter to generate the modulated signal having a certain period that is distinct from an ambient light, in response to a request, and adjusting the first driving control signal according to the phase offset signal to delay an initial phase of the modulated signal; and
a phase converter suitable for generating phase information for the phase control signal by adjusting the phase of the modulated signal based on the first driving control signal and converting the phase information according to the phase offset signal to delay an initial phase of the phase control signal.

7. The image sensing device of claim 6, wherein the driving control circuit sets the initial phase difference by delaying both the initial phases of the phase control signal and the modulated signal according to the phase offset signal.

8. The image sensing device of claim 1, wherein the image processor includes:
a signal converter suitable for converting the pixel signals into data of digital type; and
a signal processor suitable for calculating the depth phase by performing a preset image processing operation on the data and generating the depth information signal by reflecting the phase offset signal onto the depth phase.

9. The image sensing device of claim 1,
wherein the optical receiver includes a pixel array in which a plurality of unit pixels are arranged in an array type, and
wherein each unit pixel includes at least two pixels which operate for respective phases of the phase control signal.

10. An image sensing method, comprising:
outputting, at an optical emitter, a modulated signal to a target object;
generating, at an optical receiver, pixel signals corresponding to a reflected signal from the target object according to a phase control signal;
calculating a depth phase based on the pixel signals;
setting a plurality of reference phases, selecting a reference phase closest to the depth phase among the set reference phases and generating a phase offset signal representing a phase difference between the selected reference phase and the depth phase;
setting an initial phase difference between the modulated signal and the phase control signal according to the phase offset signal; and
compensating for the depth phase according to the phase offset signal to output a depth information signal,
wherein the setting of the initial phase difference includes:
generating a first driving control signal for the optical emitter to generate the modulated signal having a certain period that is distinct from an ambient light, in response to a request; and
generating phase information for the phase control signal by adjusting the phase of the modulated signal based on the first driving control signal and the phase offset signal to delay at least one of initial phases of the phase control signal and the modulated signal.

11. The image sensing method of claim 10, wherein the reference phases include 0 degree, 90 degree, 180 degree and 270 degree.

12. The image sensing method of claim 10, wherein the setting of the initial phase difference includes delaying the initial phase of the phase control signal according to the phase offset signal.

13. The image sensing method of claim 10, wherein the setting of the initial phase difference includes delaying the initial phase of the modulated signal according to the phase offset signal.

14. The image sensing method of claim 10, wherein the setting of the initial phase difference includes delaying both the initial phases of the phase control signal and the modulated signal according to the phase offset signal.

15. The image sensing method of claim 10, wherein the compensating includes:
converting the pixel signals into data of digital type; and
calculating the depth phase by performing a preset image processing operation on the data and generating the depth information signal by reflecting the phase offset signal onto the depth phase.

16. The image sensing method of claim 10,
wherein the optical receiver includes a pixel array in which a plurality of unit pixels are arranged in an array type, and
wherein each unit pixel includes at least two pixels which operate for respective phases of the phase control signal.

17. An operating method of an image sensing device, the operating method comprising:
generating and outputting a source signal to a target;
receiving a reflected signal that is the source signal reflected from the target;
generating a control signal having a lagging phase to the source signal by a predetermined amount indicated by an offset signal;
generating a pixel signal based on the reflected signal by controlling a unit pixel through the control signal;
calculating a depth phase based on the pixel signal;
outputting a depth information by compensating for the depth phase according to the offset signal;
selecting one among reference phases, the selected reference phase having a least offset from the depth phase;
updating the offset signal to represent the least offset; and
setting an initial phase difference between the source signal and the control signal according to the offset signal, wherein the setting of the initial phase difference includes: generating a first driving control signal for the optical emitter to generate the source signal having a certain period that is distinct from an ambient light, in response to a request; and generating phase information for the control signal by adjusting the phase of the source signal based on the first driving control signal and the offset signal to delay at least one of initial phases of the control signal and the source signal.

* * * * *